US012384665B2

(12) United States Patent
Benkert et al.

(10) Patent No.: US 12,384,665 B2
(45) Date of Patent: Aug. 12, 2025

(54) METHOD FOR THE COLLISION-FREE MOVEMENT OF A CRANE

(71) Applicant: Siemens Aktiengesellschaft, Munich (DE)

(72) Inventors: Johannes Benkert, Fürth (DE); Thomas Dobler, Hatzenbühl (DE); Julian Vogel, Erlangen (DE); Axel Walthelm, Buckenhof (DE)

(73) Assignee: Siemens Aktiengesellschaft, Munich (DE)

(*) Notice: Subject to any disclaimer, the term of this patent is extended or adjusted under 35 U.S.C. 154(b) by 135 days.

(21) Appl. No.: 18/278,319

(22) PCT Filed: Jan. 4, 2022

(86) PCT No.: PCT/EP2022/050065
§ 371 (c)(1),
(2) Date: Aug. 22, 2023

(87) PCT Pub. No.: WO2022/179758
PCT Pub. Date: Sep. 1, 2022

(65) Prior Publication Data

US 2024/0140763 A1 May 2, 2024

(30) Foreign Application Priority Data

Feb. 23, 2021 (EP) .................................... 21158706

(51) Int. Cl.
*B66C 15/04* (2006.01)
*B66C 13/48* (2006.01)

(52) U.S. Cl.
CPC ............ *B66C 13/48* (2013.01); *B66C 15/045* (2013.01)

(58) Field of Classification Search
CPC .............................. B66C 13/48; B66C 15/045
See application file for complete search history.

(56) References Cited

U.S. PATENT DOCUMENTS

2020/0391981 A1 12/2020 Dobler et al.
2022/0204319 A1 6/2022 Ladra et al.

FOREIGN PATENT DOCUMENTS

CN 111891928 A 5/2008
CN 111970477 A 11/2020
(Continued)

OTHER PUBLICATIONS

PCT International Search Report and Written Opinion of International Searching Authority mailed Apr. 20, 2022 corresponding to PCT International Application No. PCT/EP2022/050065 filed Jan. 4, 2022.
(Continued)

*Primary Examiner* — Mathew Franklin Gordon
(74) *Attorney, Agent, or Firm* — Henry M. Feiereisen LLC

(57) ABSTRACT

In a method for a collision-free movement of a crane in a crane lane, a sensor captures a first training data set of raw data during a movement of the crane outside a crane operation in the crane lane. The first training data set is evaluated while teaching a first neural network based on the captured raw data and first training data are determined from the evaluated first training data set. The sensor captures current sensor data during a movement of the crane during the crane operation in the crane lane. The current sensor data is compared with the first training data, and an anomaly is detected between the current sensor data and the first training data.

20 Claims, 5 Drawing Sheets

(56) References Cited

FOREIGN PATENT DOCUMENTS

| | | | |
|---|---|---|---|
| CN | 112010185 | A | 12/2020 |
| EP | 3733586 | A1 | 11/2020 |
| EP | 3750842 | A1 | 12/2020 |
| WO | WO 2020193858 | A1 | 10/2020 |

OTHER PUBLICATIONS

Price, Leon et al.: "Multisensor-driven real-time crane monitoring system for blind lift operations: Lessons learned from a case study"; XP 086500897, Institute for Robotics and Intellident Machines, Georgia Institute of Technology. 777Atlanta Dr N.W, Atlanta, GA 30332-0355, USA; https://doi.org/10.1016h.autor.2021.20552; Aug. 25, 2020.

METHOD FOR THE COLLISION-FREE MOVEMENT OF A CRANE

CROSS-REFERENCES TO RELATED APPLICATIONS

This application Is the U.S. National Stage of International Application No. PCT/EP2022/050065, filed Jan. 4, 2022, which designated the United States and has been published as International Publication No. WO 2022/17975 A1 and which claims the priority of European Patent Application, Serial No. 21158706.8, filed Feb. 23, 2021, pursuant to 35 U.S.C. 119 (a)-(d).

BACKGROUND OF THE INVENTION

The invention relates to a method for the collision-free movement of a crane in a crane lane.

The invention also relates to a control unit with means for carrying out such a method.

The invention moreover relates to a computer program for carrying out such a method when running in a control unit.

In addition, the invention relates to a safety system with at least one, in particular optical, sensor and such a control unit.

Furthermore, the invention relates to a crane with at least one such safety system.

In particular in container terminals, loading processes increasingly take place in an automated manner with the aid of cranes, that is to say without manual interventions by operators. In order to ensure the safety of the loading processes, in particular in the case of cranes operating in an automated manner, there is a great need for safety systems and protective apparatuses which monitor the lanes or the surroundings during crane movements in order to avoid collisions with objects or persons.

In such terminals, for example gantry cranes, in particular container cranes, which are also called container bridges, are used. Such gantry cranes are moved in a crane lane, for example on rails. Rubber tired gantry cranes, so-called RTGs, are moved without rails. As disturbances due to obstacles such as persons and/or objects, for example incorrectly parked cars, transport vehicles or tools, can occur in the crane lane, there is a need for safety systems and protective apparatuses for detecting such disturbances.

Patent application EP 3 750 842 A1 describes a method for loading a load by means of a crane system, wherein at least one image data stream is generated by means of a camera system of the crane system and analyzed by means of a computing unit on the basis of an artificial neural network. Based on the analysis, a first and a second marker are detected by means of the computing unit in respective individual images of the at least one image data stream. Positions of the markers are determined and the load is loaded in an automated manner by means of a hoist of the crane system depending on the positions of the markers.

Patent application EP 3 733 586 A1 describes a method for the collision-free movement of a load with a crane in a space with at least one obstacle. In order to comply with a safety level in the simplest possible manner, it is proposed that a position of the obstacle is provided, wherein at least one safe state variable of the load is provided, wherein a safety zone surrounding the load is determined from the safe state variable, and wherein the safety zone is dynamically monitored in relation to the position of the obstacle.

The object of the invention is to specify a reliable method for the collision-free movement of a crane in a crane lane.

SUMMARY OF THE INVENTION

The object is achieved according to the invention by a method for the collision-free movement of a crane in a crane lane, comprising the following steps: capturing a first training data set of raw data by means of at least one, in particular optical, sensor during a movement of the crane outside crane operation in the crane lane; evaluating the first training data set, teaching a first neural network on the basis of the captured raw data; determining first training data from the evaluated first training data set; capturing current sensor data by means of the at least one, in particular optical, sensor during a movement of the crane during crane operation in the crane lane; comparing the current sensor data with the first training data and detecting an anomaly between the current sensor data and the first training data.

Furthermore, the object is achieved according to the invention by a control unit with means for carrying out such a method.

Moreover, the object is achieved according to the invention by a computer program for carrying out such a method when running in a control unit.

In addition, the object is achieved according to the invention by a safety system with at least one, in particular optical, sensor and such a control unit.

Furthermore, the object is achieved according to the invention by a crane with at least one such safety system.

The advantages and preferred embodiments described below with reference to the method can be transferred analogously to the control unit, the computer program, the safety system and the crane.

The invention is based on the consideration of reliably avoiding collisions during the movement of a crane in a crane lane by identifying possible obstacles such as persons and/or objects as anomalies during crane operation. An anomaly is a deviation from a "normal situation", which is also called a "target situation". The detection method is based on a first neural network which is trained in advance outside the actual crane operation. In addition, further training data can be collected during operation for subsequent optimization. In this case, a first training data set is determined, for example, temporally successive or randomized raw data, which is captured by means of at least one, in particular optical, sensor. In particular, the first training data set contains raw data of day and night times as well as different weather conditions of the crane lanes, which are captured during a movement of the crane in a "normal situation". The first training data set is evaluated while teaching the first neural network on the basis of the captured raw data, first training data being determined from the evaluated training data set. The described teach-in of the first neural network takes place, for example, during a commissioning of the crane and/or during a project phase. The teach-in can take place offline, e.g, in a cloud. The data need not be completely from the same crane.

During crane operation, current sensor data is captured by means of the at least one, in particular optical, sensor during a movement of the crane in the crane lane. The current sensor data is then compared with the first training data. If an obstacle such as a person and/or an object is located in the region of the crane lane and is captured by at least one sensor, an anomaly between the current sensor data and the first training data is detected so that, for example, an alarm can be triggered and/or the loading process of the crane can be stopped automatically. Anomalies which do not correspond to the "normal situation" are detected. Anomaly detection takes place independently of the kind, the shape and the type of object as it is not possible to predict which object may be located in the region of the crane lane and whether this represents an obstacle for the crane. A control unit which is assigned in particular to the crane has means for carrying out the method which comprise, for example, a digital logic module, in particular a microprocessor, a microcontroller or an ASIC (application-specific integrated circuit). In addition or alternatively, the means for carrying out the method comprise a GPU or a so-called AI accelerator.

A further embodiment provides that the first neural network is at least partially assigned to a central IT infrastructure during teach-in, the raw data for evaluating the training data being sent to the central IT infrastructure. A central IT infrastructure is, for example, at least one local computer system which is not assigned to the crane, and/or a cloud. The central IT infrastructure provides storage space, computing power and/or application software. In the cloud, storage space, computing power and/or application software are made available as a service via the Internet. Such a cloud environment is, for example, the "MindSphere". The, in particular digital, data transmission with the central IT infrastructure takes place wirelessly, for example. In particular, the data is transmitted via WLAN. As the evaluation of the first neural network while teaching the first training data set requires large GPU/CPU powers, it is advantageous to carry out the evaluation in such a central IT infrastructure in order to save time and costs.

A further embodiment provides that the first training data is sent from the central IT infrastructure to a detection module assigned to the crane. This makes it possible for the comparison of the current sensor data with the first training data and the anomaly detection to take place quickly and reliably as delays and possible disturbances in the connection to the central IT infrastructure are avoided during actual crane operation.

A further embodiment provides that the at least one sensor, in particular an optical sensor, is designed as a camera, lane markings in the region of the crane lane being captured by means of the camera. Such lane markings are for example, hatched areas, lines or rails. The at least one camera is designed, for example, as an analog camera and/or as an IP camera. A camera is cost-effective, in particular in comparison with a radar-based or laser-based system. In particular, the cameras are already installed, for example for the purpose of remote control and/or for automatic driving of the crane, called ASA (Auto Steering Assistance System), obviating the need for additional hardware and giving rise to an additional cost advantage.

A further embodiment provides that the plausibility of the detection of the anomaly is checked by means of a confidence estimation of the first neural network. Such a plausibility check further increases the reliability of the method.

A further embodiment provides that the method comprises the following additional steps: providing second training data from a second training data set and teaching a second neural network, comparing the current sensor data with the second training data and detecting an object in the current sensor data. In particular, the second neural network is pretrained for object detection. Pretrained objects are for example, persons, cars, transport vehicles, lifting tools and/or containers. Redundancy due to a combination of an anomaly detection with an object detection additionally increases the stability and thus the reliability of the method.

A further embodiment provides that the detection of the object takes place at the same time as the detection of the anomaly. The simultaneous combination of the results of both detection methods achieves the greatest possible stability and speed of the method.

A further embodiment provides that the detection of the object takes place in the detection module assigned to the crane. Such a local detection method enables a rapid and reliable sequence as delays and possible disturbances due to additional connections up to a temporary failure of data transmission are avoided.

A further embodiment provides that the plausibility of the detection of the object is checked by means of a confidence estimation of the second neural network. Such a plausibility check further increases the reliability of the method.

A further embodiment provides that the crane is stopped after the detection of the anomaly and/or the detection of the object. Such redundancy achieves the greatest possible stability of the method.

A further embodiment provides that the crane is moved, in particular completely, in an automated manner in the crane lane. Such a movement of the crane, in particular completely, in an automated manner during crane operation accelerates the loading and unloading process and saves costs as a result.

BRIEF DESCRIPTION OF THE DRAWING

The invention is described and explained in more detail hereinafter with reference to the exemplary embodiments in the figures.

DETAILED DESCRIPTION OF PREFERRED EMBODIMENTS

Figure 1:
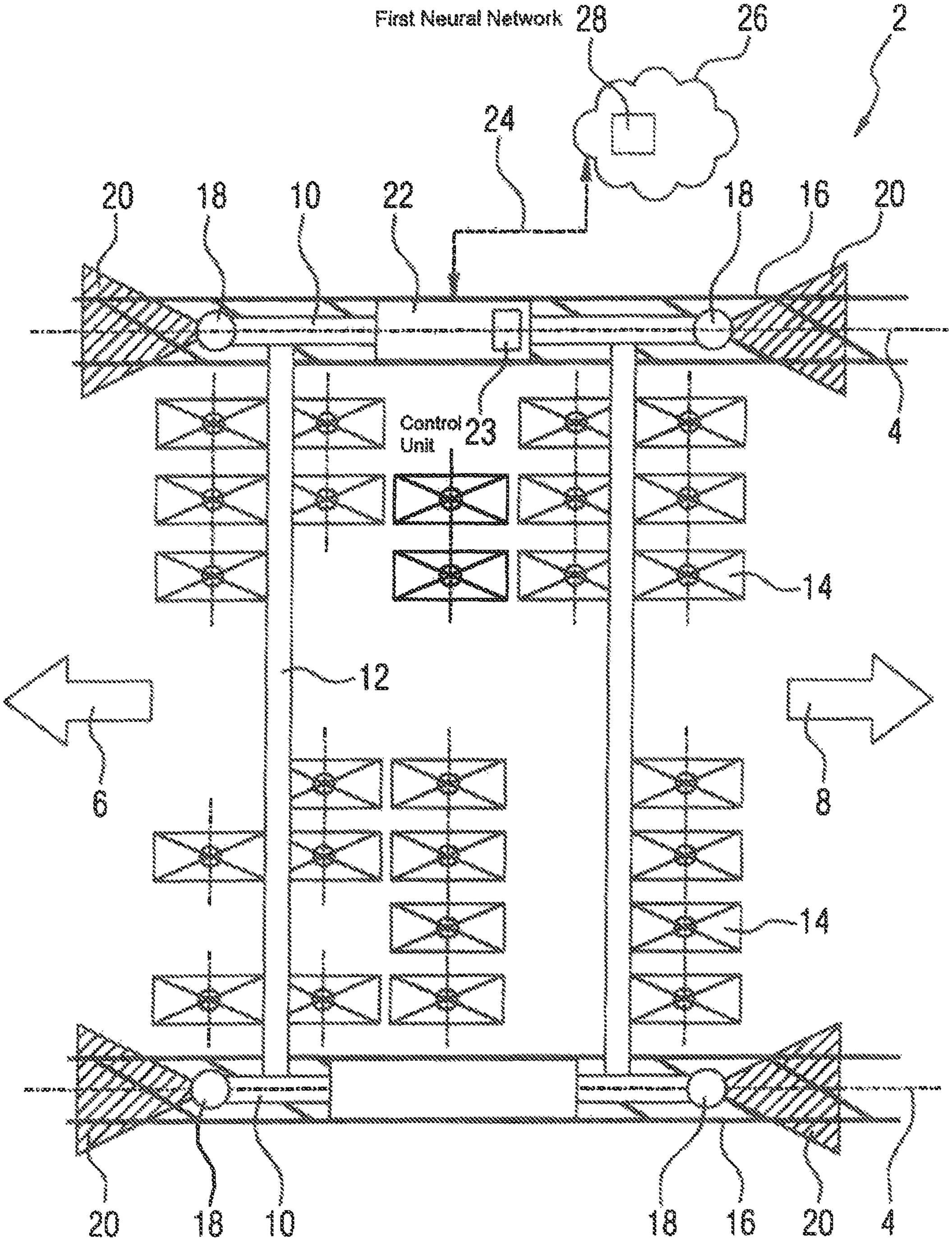
FIG. 1 A diagrammatic view of a gantry crane.

The exemplary embodiments explained hereinafter are preferred embodiments of the invention. In the exemplary embodiments, the described components of the embodiments each represent individual features of the invention which are to be considered independently of one another and which in each case also develop the invention independently of one another and are therefore also to be regarded as part of the invention individually or in a combination other than that shown. Furthermore, the described embodiments can also be supplemented by further features of the invention already described.

The same reference characters have the same meaning in the various figures.

FIG. 1 shows a diagrammatic view of a crane 2 which can be moved in a crane lane 4 in a first direction of travel 6 and in a second direction of travel 8. The crane 2 is designed, by way of example, as a rubber-tired gantry crane, in particular a container crane, which has supports 10 which are connected via a crane bridge 12. A spreader and a trolley are not shown in FIG. 1 for reasons of clarity. During a crane operation, the crane 2 is moved in an automated manner by means of lane markings 16 for loading and/or unloading loads 14 designed as containers. The lane markings 16 are designed, for example, as hatched areas. Alternatively, the crane 2 is moved in an automated manner on rails. For the movement of the crane 2 in an automated manner in the crane lane 4, at least one sensor 18, in particular an optical sensor, is used. By way of example, the crane 2 in FIG. 1 has two sensors 18 in each case for a direction of travel 6, 8. For example, the sensors 18 are designed as cameras for capturing the lane markings 16 in the region of the crane lane 4, one of the two cameras for the respective direction of travel 6, 8 being mounted on one of the supports 10 of the crane 2 and having a detection area 20 in the respective direction of travel 6, 8. In particular, the cameras are arranged in a weatherproof housing with a sun roof and are installed downwards at an angle of 20° to 30°, in particular 25°±2°, in order to minimize impairment of image capture by weather conditions, for example by sun and rain, even over a longer period of time. In particular, the four sensors 18 designed as cameras, for example for the purpose of remote control and/or for automatic driving of the crane 2, called ASA (Auto Steering Assistance System), are already installed on the crane 2, obviating the need for any additional sensor hardware. The data captured by the sensors 18 is transmitted to a detection module 22 for video evaluation. The detection module 22 comprises crane automation, which is also called crane PLC, and a control unit 23 for controlling the method. Depending on the direction of travel 6, 8 an evaluation for the respective camera side is carried out. In particular, the cameras of the respective camera side are simultaneously evaluated and run through the same detection process in parallel. The detection module 22 is connected to a central IT infrastructure 26 via a digital data connection 24, A central IT infrastructure 26 is, for example, at least one local computer system, which is not assigned to the crane, and/or a cloud. The central IT infrastructure 26 provides storage space, computing power and/or application software. In the cloud storage space, computing power and/or application software are provided as a service via the Internet. Such a cloud environment is the "MindSphere", for example. Data transmission, in particular digital data transmission, takes place, for example, wirelessly. In particular, the data is transmitted via WLAN. The central IT infrastructure 26 comprises a first neural network 28 in FIG. 1. In particular, the detection module 22 assigned to the crane 2 comprises a first neural network 28, which is provided via the central IT infrastructure 26.

Figure 2:
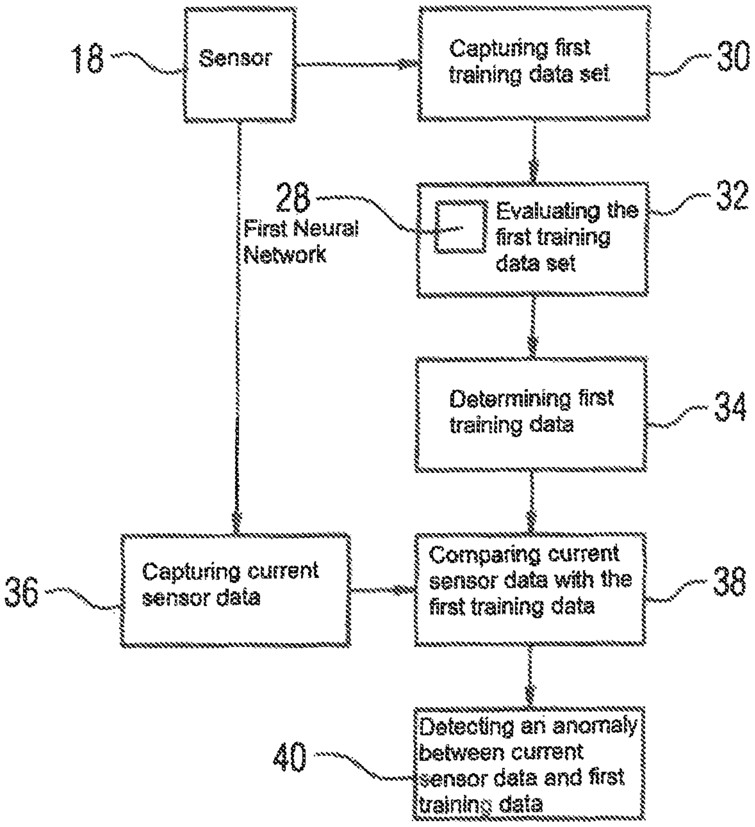
FIG. 2 A flow chart of a first method for the movement of a crane in an automated manner, FIG. 3 A flow chart of a second method for the movement of a crane in an automated manner, FIG. 4 A flow chart of a third method for the movement of a crane in an automated manner, FIG. 5 A flow chart of a fourth method for the movement of a crane in an automated manner, FIG. 6 A flow chart of an image evaluation in a detection module, FIG. 7 A first example image with a lane marking and FIG. 8 A second example image with a lane marking.

FIG. 2 shows a flow chart of a first method for the movement of a crane 2 in an automated manner, the crane 2, for example, being designed as in FIG. 1. The method comprises capturing 30 a first training data set of temporally successive raw data by means of at least one sensor 18, in particular an optical sensor, during a movement of the crane 2 outside crane operation in the crane lane 4. In addition, further training data can be collected during operation for subsequent optimization. In particular, the first training data set is captured when the crane 2 is moved in the first direction of travel 6 and in the second direction of travel 8. The raw data is embodied, for example, as camera images which are read cyclically during the movements of the crane 2 and made available to the detection module 22. In particular, lane markings 16 are captured in the region of the crane lane 4 by means of at least one camera.

An evaluation 32 of the first training data set is then carried out while teaching a first neural network 28 on the basis of the captured raw data. The raw data comprises, for example, image sequences of day and night times as well as different weather conditions of the crane lane 4 in a "normal situation" or "target situation", In particular, additional information, which is stored, for example, in an additional text file, is assigned to the image sequences manually or in an automated manner. The additional information includes, for example, label information. Label information contains information about where a search pattern is located in an image. As different lane markings 16 are used in terminals, for example, as yet unknown types of lane markings 16, which are in particular called object classes, can be trained when teaching the first neural network 28. For example, the first neural network 28 is at least partially assigned to the central IT infrastructure 26, the raw data for evaluating 32 the first training data set being sent to the central IT infrastructure 26 as high GPU/CPU capacities are required for this purpose. For example, it is placed on an already trained first neural network 28, this being trained to recognize new, in particular project-specific, lane markings 16.

First training data is then determined 34 from the evaluated first training data set, the first training data being sent from the central IT infrastructure 26 to the detection module 22 of the crane 2. The teaching described by means of the first neural network 28 takes place, for example, during commissioning of the crane 2 and can be expanded as required during a project phase.

During actual crane operation, capturing 36 of current sensor data takes place by means of the at least one, in particular optical, sensor 18 during a movement of the crane 2 in a direction of travel 6, 8 in the crane lane 4, a comparison 38 of the current sensor data with the first training data thereupon taking place.

If an object, for example, a person or an object, is located in the region of the crane lane 4 and is captured by at least one sensor 18 during crane operation, detection 40 of an anomaly takes place between the current sensor data and the first training data. Detecting 40 the anomaly takes place independently of the kind, the shape and the type of object as it is not possible to predict which object may be located in the region of the crane lane 4 and whether this represents an obstacle for the crane.

For example, after detecting 40 the anomaly, an alarm is triggered and/or the complete loading process is automatically stopped. In particular, evaluation images which triggered the alarm and/or led to the stop can be archived. The evaluation images can be displayed, for example at an operator operating station.

Figure 3:
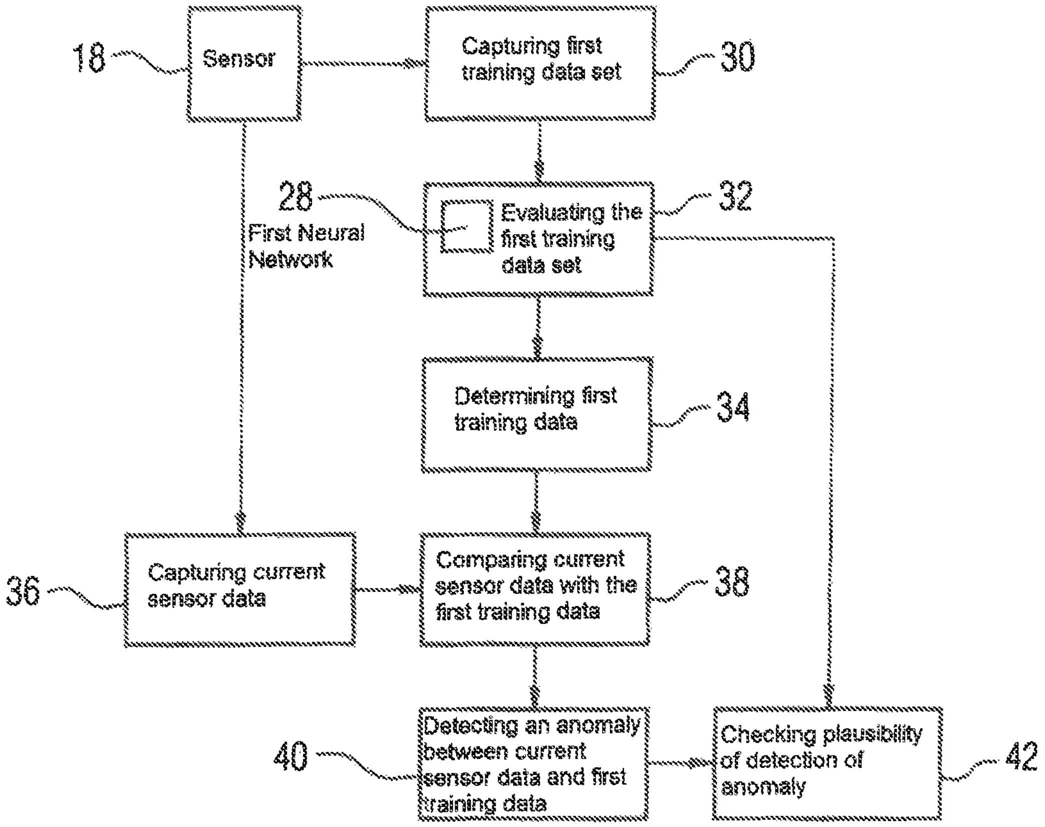

FIG. 3 shows a flow chart of a second method for the movement of a crane 2 in an automated manner. After detecting 40 the anomaly, checking 42 the plausibility of the detection of the anomaly takes place by means of a confidence estimation of the first neural network 28. The further embodiment of the method in FIG. 3 corresponds to that in FIG. 2.

Figure 4:
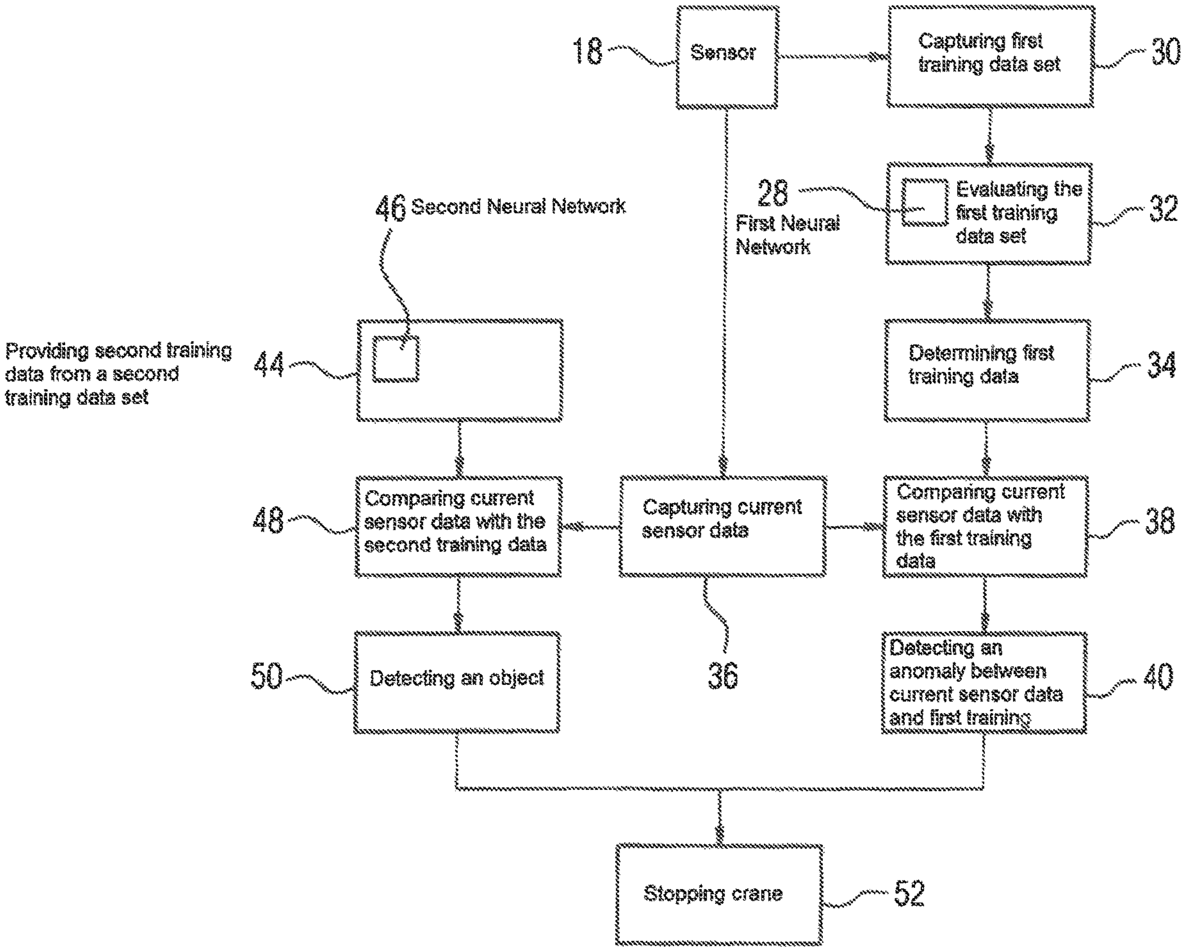

FIG. 4 shows a flow chart of a third method for the movement of a crane 2 in an automated manner. The third method comprises providing 44 second training data from a second training data set of a second neural network 48. In particular, the second neural network 46 is pretrained for object detection. Pretrained objects are, for example, persons, cars, transport vehicles, lifting tools and/or containers.

A comparison 48 of the current sensor data with the second training data is then carried out. In particular, for the comparison 48 with the second training data, essentially at the same time, the same current sensor data is used for the comparison with the first training data 38. Furthermore, the same at least one sensor 18 is used for both comparisons. If an object is located in the region of the crane lane 4 and is captured by at least one sensor 18 during crane operation, capturing 50 the object takes place in the current sensor data. In particular, detecting 50 the object takes place essentially at the same time as detecting 40 the anomaly, the greatest possible stability of the system being achieved by a combination of the results of both detection methods, anomaly and object detection.

Stopping 52 the crane 2 then takes place after detecting 40 the anomaly and/or detecting 50 the object. Alternatively, an alarm is triggered. If required, the crane 2 is stopped manually. The further embodiment of the method in FIG. 4 corresponds to that in FIG. 3.

Figure 5:
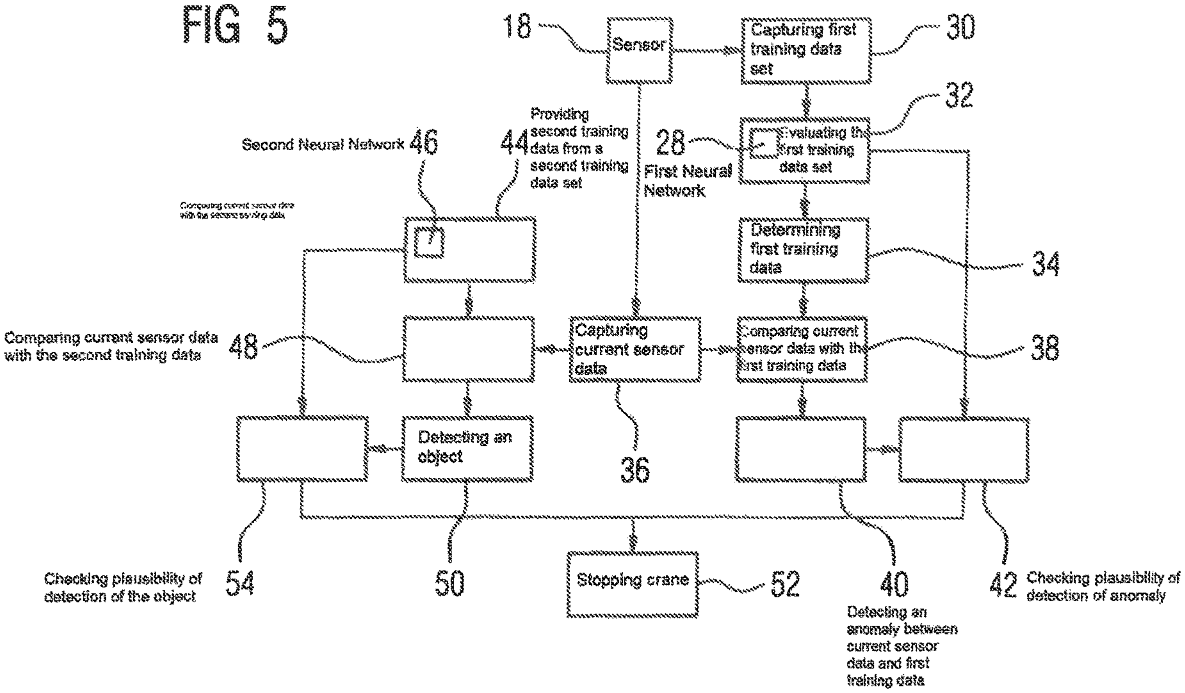

FIG. 5 shows a flow chart of a fourth method for the movement of a crane 2 in an automated manner. After detecting 50 the object, checking 54 the plausibility of the detection of the object takes place by means of a confidence estimation of the second neural network 46. The further embodiment of the method in FIG. 5 corresponds to that in FIG. 3.

Figure 6:
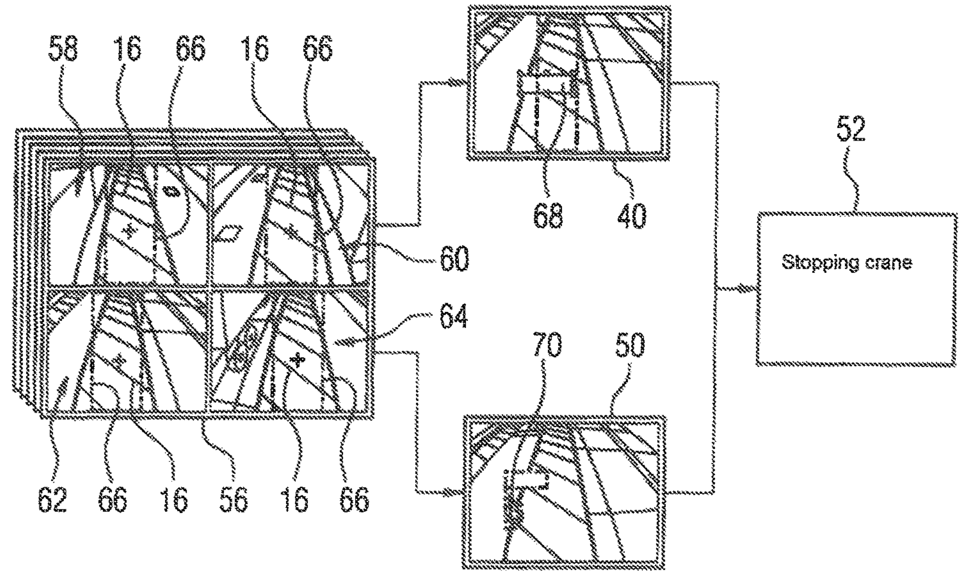

FIG. 6 shows a flow chart of an image evaluation in a detection module, the provision 56 of current sensor data taking place by means of the four cameras shown in FIG. 1. The four image sequences 58, 60, 62, 64 respectively captured by a camera each comprise label information 66 in the region of the lane markings 16 for marking the desired image sections. Depending on the direction of travel 6, 8, in each case two of the image sequences 58, 60, 62, 64 are relevant for further evaluation. Comparing the current sensor data with the respective training data results in the detection 40 of an anomaly 68 and the detection 50 of an object 70. Stopping 52 of the crane 2 thereupon takes place.

FIG. 7 shows a first example image 72 with a lane marking 16, which is designed as hatched areas and is suitable, for example, for a rubber-tired gantry crane.

FIG. 8 shows a second example image 74 with a lane marking 16, which is designed as rails for a crane 2 which can be moved on rails. Furthermore, FIG. 8 shows label information 66 for marking the desired image section.

In summary, the invention relates to a method for collision-free movement of a crane 2 in a crane lane 4, In order to achieve the highest level of reliability possible, it is proposed that the method comprises the Wowing steps: capturing 30 a first training data set of temporally successive raw data by means of at least one sensor 18, in particular an optical sensor, during a movement of the crane 2 outside crane operation in the crane lane 4; evaluating 32 the first training data set, teaching a first neural network 28 on the basis of the captured raw data; determining 34 first training data from the evaluated first training data set; capturing 36 current sensor data by means of the at least one sensor 18, in particular an optical sensor, during a movement of the crane 2 during crane operation in the crane lane 4; comparing 38 the current sensor data with the first training data and detecting 40 an anomaly between the current sensor data and the first training data.

The invention claimed is:

1. A method for a collision-free movement of a crane in a crane lane, said method comprising:

capturing with a sensor a first training data set of raw data during a movement of the crane outside a crane operation in the crane lane;

evaluating the first training data set while teaching a first neural network based on the captured raw data;

determining first training data from the evaluated first training data set;

capturing with the sensor current sensor data during a movement of the crane during the crane operation in the crane lane;

comparing the current sensor data with the first training data; and detecting an anomaly between the current sensor data and the first training data.

2. The method of claim 1, wherein the sensor is an optical sensor.

3. The method of claim 1, further comprising:

at least partially assigning the first neural network to a central IT infrastructure; and sending the raw data of the first training data set for evaluating the first training data set to the central IT infrastructure.

4. The method of claim 2, further comprising sending the first training data from the central IT infrastructure to a detection module assigned to the crane.

5. The method of claim 1, wherein the sensor is designed as a camera, and further comprising capturing lane markings in a region of the crane lane by the camera.

6. The method of claim 1, further comprising checking a plausibility of a detection of the anomaly through a confidence estimation of the first neural network.

7. The method of claim 1, further comprising:

providing second training data from a second training data set of a second neural network;

comparing the current sensor data with the second training data; and detecting an object in the current sensor data.

8. The method of claim 7, wherein the object is detected at a same time as the anomaly is detected.

9. The method of claim 7, wherein the object is detected in a detection module assigned to the crane.

10. The method of claim 7, further comprising checking a plausibility of a detection of the object through a confidence estimation of the second neural network.

11. The method of claim 7, further comprising stopping the crane after detection of the anomaly and/or detection of the object.

12. The method of claim 1, further comprising moving the crane in an automated manner in the crane lane.

13. The method of claim 12, wherein the crane is moved completely in an automated manner in the crane lane.

14. A control unit, comprising at least one of a digital logic module, GPU and AI accelerator for carrying out a method as set forth in claim 1.

15. The control unit of claim 14, wherein the digital logic module is a microprocessor, a microcontroller or an ASIC (application-specific integrated circuit).

16. A computer program product, comprising a computer program embodied in a non-transitory computer readable medium, wherein the computer program, when loaded Into a control unit as set forth in claim 15 and executed by the control unit, causes the control unit to perform the steps of:

capturing with a sensor a first training data set of raw data during a movement of the crane outside a crane operation in the crane lane;

evaluating the first training data set while teaching a first neural network based on the captured raw data;

determining first training data from the evaluated first training data set;

capturing with the sensor current sensor data during the movement of the crane during the crane operation in the crane lane;

comparing the current sensor data with the first training data; and detecting an anomaly between the current sensor data and the first training data.

17. A safety system, comprising:

a sensor designed to capture a first training data set of raw data during a movement of a crane outside a crane operation in a crane lane; and a control unit communicating with the sensor to receive the first training data set of raw data and designed to carry out a method as set forth in claim 1.

18. The safety system of claim 17, wherein the sensor is an optical sensor.

19. A crane, comprising a safety system, said safety system comprising a sensor designed to capture a first training data set of raw data during a movement of a crane outside a crane operation in a crane lane, and a control unit communicating with the sensor to receive the first training data set of raw data and designed to carry out a method as set forth in claim 1.

20. The crane of claim 19, designed as a gantry crane and further comprising a further said sensor, said crane being movable in at least two directions of travel, in particular opposite directions of travel, with the directions of travel being assigned to the sensor and further sensor, respectively, which have each a detection area in a corresponding one of the directions of travel.

* * * * *